(12) United States Patent
Kanada et al.

(10) Patent No.: US 7,599,891 B2
(45) Date of Patent: Oct. 6, 2009

(54) METHOD AND SYSTEM FOR ADMINISTERING STORAGE MEDIUM

(75) Inventors: Yoriaki Kanada, Kanagawa (JP); Tatsuya Inokuchi, Tokyo (JP); Shunsuke Furukawa, Tokyo (JP); Takao Ihashi, Chiba (JP); Takashi Yamanishi, Tokyo (JP); Yoichiro Sako, Tokyo (JP); Akiya Saito, Kanagawa (JP); Shinichi Fujita, Shizuoka (JP)

(73) Assignee: Sony Corporation, Tokyo (JP)

( * ) Notice: Subject to any disclaimer, the term of this patent is extended or adjusted under 35 U.S.C. 154(b) by 1017 days.

(21) Appl. No.: 10/394,214

(22) Filed: Mar. 24, 2003

(65) Prior Publication Data

US 2004/0024654 A1     Feb. 5, 2004

(30) Foreign Application Priority Data

Mar. 25, 2002  (JP)  ............................. 2002-084044
Mar. 18, 2003  (JP)  ............................. 2003-074303

(51) Int. Cl.
  *G06F 21/00*     (2006.01)
(52) U.S. Cl. .......................................... 705/58; 705/56
(58) Field of Classification Search ........................ None
  See application file for complete search history.

(56) References Cited

U.S. PATENT DOCUMENTS 5,489,768 A * 2/1996 Brownstein et al. .... 235/462.01
5,819,100 A * 10/1998 Pearce ......................... 713/323
6,000,030 A * 12/1999 Steinberg et al. ............... 726/28
6,119,108 A *  9/2000 Holmes et al. ................ 705/40

FOREIGN PATENT DOCUMENTS

JP   2001-319188   11/2001
JP   2002-024767    1/2002

OTHER PUBLICATIONS

Palmer, Roger C., The Bar Code Book: Reading, Printing, and Specification of Bar Code Symbols, 2nd ed., Helmers Publishing, Inc., Peterborough, NH, 1991.*
Standard ECMA-130, 2nd ed., ECMA, Geneva, Switzerland, Jun. 1996.*

* cited by examiner

*Primary Examiner*—Andrew J. Fischer
*Assistant Examiner*—Joshua Murdough
(74) *Attorney, Agent, or Firm*—Oblon, Spivak, McClelland, Maier & Neustadt, L.L.P.

(57) ABSTRACT

An administrative system receives unique ID information of disk from an orderer for ordering manufacture of the disks and provides the unique ID information for a disk maker. The maker stores on the disk unique attribute information of the disk including identification information for the disk maker side. The administrative system obtains normal recording information generated if normal recording is carried out when recording on the disk the unique attribute information of the disk. Alternatively, the administrative system obtains abnormal recording information generated if abnormal recording is carried out. Disk administrative information, for example, number of pieces of the disks delivered from the factory, is generated from the obtained normal and abnormal recording information.

21 Claims, 13 Drawing Sheets

FIG. 4

| SOFT CUSTOMERS (NAMES OF ORDERERS) | CUSTOMER NUMBERS | TITLES (NAMES OF ALBUMS) | DISK ID (PRODUCT SERIAL NUMBERS etc.) |
|---|---|---|---|
| M S | 255 | MS OFFICE | 1021234 |
| M S | 255 | MS OFFICE | 1031235 |
| M S | 255 | MS OFFICE | 1041236 |
| M S | 255 | MS OFFICE | 1051237 |

F I G. 7

INFORMATION TO BE APPLIED TO THE DISK BY FACTORY ←→ INFORMATION PROVIDED BY THE ADMINISTRATOR SIDE

| NAMES OF FACTORIES IN DISK MAKERS (DISK MAKER CODES) | DATE | TIME | NUMBERS OF APPARATUSES FOR WRITING UNIQUE ATTRIBUTE INFORMATION OF DISK | SOFT CUSTOMERS (NAMES OF ORDERERS) | CUSTOMER NUMBERS | TITLES (NAMES OF ALBUMS) | DISK ID (PRODUCT SERIAL NUMBERS etc.) |
|---|---|---|---|---|---|---|---|
| ABC1 | 2001/05/05 | 12:02:20 | No. 24 | MS | 255 | MS OFFICE | 1021234 |
| ABC1 | 2001/05/05 | 12:02:30 | No. 24 | MS | 255 | MS OFFICE | 1031235 |
| ABC1 | 2001/05/05 | 12:02:40 | No. 24 | MS | 255 | MS OFFICE | 1041236 |
| ABC1 | 2001/05/05 | 12:02:50 | No. 24 | MS | 255 | MS OFFICE | 1051237 |

F I G. 8

| NAMES OF FACTORIES IN DISK MAKERS (DISK MAKER CODES) | NAMES OF COMMISSIONED COMPANIES | NUMBERS OF APPARATUSES FOR WRITING UNIQUE ATTRIBUTE INFORMATION OF DISK (R No.) | THE UNIQUE ATTRIBUTE INFORMATION OF DISK RECORDED ON THE DISK (DISK MAKER CODES/YEAR, MONTH, DATE AND TIME OF MANUFACTURE/R No. /CUSTOMER/TITLE/DISK ID) |
|---|---|---|---|
| ABC1 | ABC Co. | No. 2 4 | ABC1/2001/05/05/12:02:20/24/MS/MS OFFICE/1021234 |
| | | | ABC1/2001/05/05/12:02:30/24/MS/MS OFFICE/1031235 |
| | | | ABC1/2001/05/05/12:02:40/24/MS/MS OFFICE/1041236 |
| | | | ABC1/2001/05/05/12:02:50/24/MS/MS OFFICE/1051237 |
| ABC2 | ABC Co. | No. 2 5 | |
| DEF10 | DEF Co. | No. 2 6 | |
| DEF11 | DEF Co. | No. 2 7 | |

FIG. 9

| NAMES OF THE ORDERERS FOR ORDERING MANUFACTURE OF DISKS (CLIENTS) | NAMES OF COMMISSIONED COMPANIES | NAMES OF FACTORIES IN DISK MAKERS | INFORMATION ON DELIVERED DISKS (NORMAL RECORDING INFORMATION) PIECES OF DISKS | ADMINISTRATION FEES  YEN |
|---|---|---|---|---|
| X Y Z | A B C Co. | No. 1 | 12456 | 124560 |
| X Y Z | A B C Co. | No. 2 | 25167 | 251670 |
| X Y Z | D E F Co. | No.10 | 36523 | 365230 |
| X Y Z | D E F Co. | No.11 | 36987 | 369870 |
| TOTAL AMOUNT OF CHARGED FEES FROM CLIENT (XYZ) | 10 YEN/DISK | | 111,133 | 1,111,330 |

F I G. 1 0

| NUMBERS OF APPARATUSES FOR WRITING UNIQUE ATTRIBUTE INFORMATION OF DISK | NUMBERS OF PIECES OF USED UNIQUE ATTRIBUTE INFORMATION (INCLUDING INFORMATION ON FAULTY RECORDING) | LIFE EXPECTANCY DEGREE UP TO OPERATING LIFE OF LASER (%) |
|---|---|---|
| No. 1 | 120,000 | 94 |
| No. 2 | 150,000 | 94 |
| No. 3 | 550,000 | 65 |
| No. 4 | 300,000 | 90 |
| No. 5 | 250,000 | 91 |
| No. 6 | 700,000 | 35 |
| No. 7 | 790,000 | 10 |

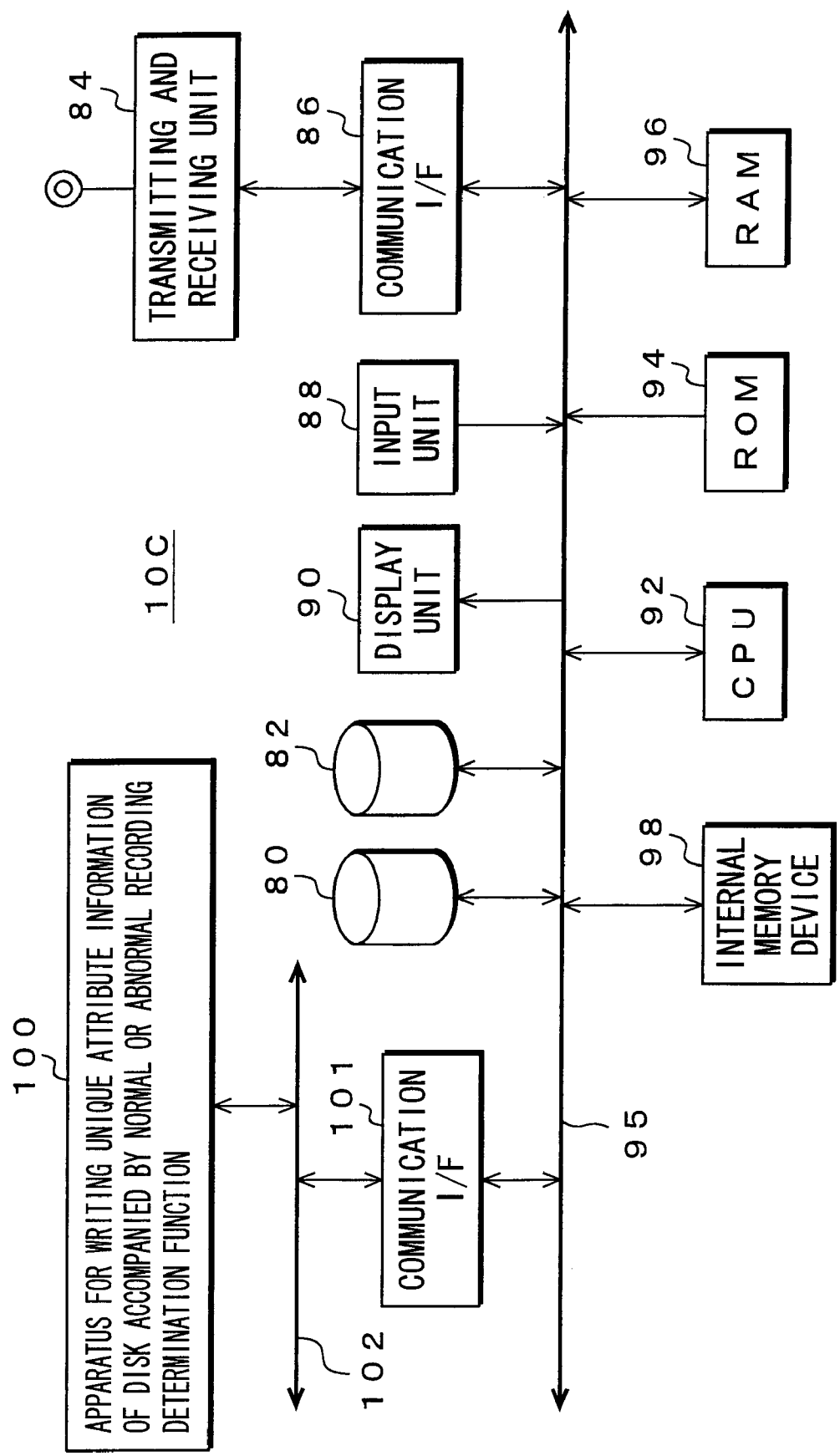

METHOD AND SYSTEM FOR ADMINISTERING STORAGE MEDIUM

BACKGROUND OF THE INVENTION

1. Field of the Invention

The present invention relates to a method and system for administering storage medium. More particularly, the invention relates to a method and system for administering storage medium such as disk-like storage medium, which are preferably applied to, for example, a case where unique identification information is recorded on the storage medium as manufacturing the storage medium.

2. Description of Related Art

If disk-like storage medium (hereinafter referred to as "disk") such as a compact disk is manufactured, an orderer for ordering manufacture of the storage medium such as a software house first orders a commissioned manufacturer for manufacturing the storage media such as a disk maker to manufacture the storage media. The software house that administrates a variety of contents will be referred to as "client" of the commissioned manufacturer. The client then provides the disk maker with master disk itself that records information or raw data. When the maker receives the master disk as recording information, it makes a stamper based on the master disk so that it can manufacture the disks of only a contracted number under contract condition. The maker then delivers or transports them from its factory to the client. Alternatively, when the maker receives the raw data as recording information, the maker also makes a stamper based on the data (contents to be stored) produced after performing an authoring process on the raw data so that it can manufacture the disks of only a contracted number under contract condition. The maker also delivers or transports them to the client.

The client settles the business with the disk maker depending on his or her strong confidence in the disk maker. The client often administrates the manufactured disks based on merely a related report from the maker wherein the maker has reported a history record of manufacturing the disks. The client may store contents of the related report on his or her own administrative server or the like. The maker often requests charges for manufacturing the disks on his or her report. The client may also store a schedule for a payment or the like, based on the contents of the report, on his or her administrative server and make a use of the contents for further administration.

In the disk maker, the factory usually operates under strict quality control or delivery control. Therefore, number of pieces of delivered disks that are described in the report or the like is virtually identical to that of actually delivered disks. There, however, may be a fact they are not identical. It has not yet been established how to verify the fact.

No administrative method and system have been established when the maker manufactures number of pieces of disks more than a contracted number thereof under contract with the client. Therefore, no track or verification that number of pieces of the disks more than a contracted number of pieces are illegally sold can be performed. This results in few means for tracking and verifying with reliability the history record of manufacturing the disks in the factory of the disk maker.

Alternatively, unique identification (hereinafter referred to as "unique ID") information has been recently recorded on respective disks utilizing particular disk area(s) in the disk to protect against illegal copying of software by identifying the disk maker and/or the disk seller. No duplicate unique ID should be issued. In this case using unique ID, it is almost impossible to track under the actual condition the number of pieces of the disks that are delivered from the factory of the disk maker when no administrative method and system for the unique ID information has been established.

According to the invention, the foregoing problems are solved. Thus, an object of the present invention is to provide a method and system for administering storage medium, which are preferably applied to a case where unique attribute information of the storage medium including unique ID information provided by the orderer side is recorded on the storage medium as manufacturing the storage medium. According to the invention, it is capable of tracking the number of pieces of the storage media that are actually manufactured in the factory using the information recorded on the storage medium. This allows for the exact administration not only in tracking the number of pieces of actually manufactured storage media and unique ID information itself but also in exactly paying the charges from the disk maker, which relate to an administration of storage media.

SUMMARY OF THE INVENTION

According to an aspect of the invention, a method of administering storage medium comprises obtaining unique ID information to be applied to the storage medium, which is provided by an orderer side for ordering manufacture of the storage medium, and providing commissioned manufacturer side for manufacturing the storage medium with this obtained unique ID information. The method further comprises obtaining normal recording information generated if recording on the storage medium unique attribute information of the storage medium including identification information for the commissioned manufacturer side is normally carried out or abnormal recording information generated if recording is abnormally carried out, and generating administrative information for the storage medium from at least one of the normal recording information and the abnormal recording information.

In accordance with another aspect of the invention, a system for administering storage medium comprises unique ID information transmitting and receiving device for receiving the unique ID information to be applied to the storage medium, which is provided by an orderer side for ordering manufacture of the storage medium. The unique ID information transmitting and receiving device further transmits the unique ID information to a commissioned manufacturer side for manufacturing the storage medium. The unique ID information transmitting and receiving device additionally receives normal recording information generated if recording on the storage medium unique attribute information of the storage medium including identification information for the commissioned manufacturer side is normally carried out, or abnormal recording information generated if recording is abnormally carried out.

The system further comprises administrative-information generator for generating administrative information about the storage medium from at least one of the normal recording information and the abnormal recording information. The system further comprises storage device for storing the unique ID information, the normal recording information and the abnormal recording information each thus received, and the administrative information. The system also comprises a controller for controlling the transmitting and receiving device, the administrative-information generator, and the storage device to administer the storage medium.

According to the present invention, an administrator side for administering manufacture of the storage medium, for example, disk receives unique ID information to be applied to each storage medium from an orderer side for ordering manufacture of the storage medium. The administrator side compares the unique ID information thus received with unique ID information that has been stored and registered in the administrator side. As a result of the comparison, if the contents of the received unique ID information are not identical to that of the registered unique ID information, the administrator side determines that this received unique ID information should be completely new and provides it for a commissioned manufacturer side.

On the other hand, if the contents of the received unique ID information are identical to that of the registered unique ID information, the administrator side inquires the received unique ID information to the orderer side. This avoids wrong order from the orderer side, a case where the same unique ID information is recorded on the storage medium in another orderer side for ordering manufacture of the storage medium, and illegal order from another orderer side. The orderer side may verify the unique ID information provided for the commissioned manufacturer side by directly accessing a site of the administrator side not via the administrator for storage medium. This avoids wrong order from the administrator side.

The unique ID information comprises at least identification number (disk ID) including product serial number of the disk. The unique ID information may involve the disk ID combining numbers, letters, signs and the like, that the orderer side specifies, with each other. The orderer side allows a configuration of the disk ID to be set according to his or her voluntary regulations. The administrator side may set the disk ID in some cases by obtaining authorization from the orderer side if the unique ID information is composed of simple product serial number.

The administrator side provides the unique ID information for the commissioned manufacturer side for manufacturing the storage medium, for example, a disk maker. The disk maker records on each storage medium the unique attribute information of the storage medium (disk-like storage medium) to which identification information for the disk maker side is automatically applied. This identification information for the disk maker side includes a name of maker (factory name), a date, a month and a year for manufacture, and a name of recording apparatus for recording the unique attribute information of the storage medium, which are applied by the disk maker.

The administrator side obtains from the disk maker side normal recording information generated if normal recording is carried out when recording on the storage medium the unique attribute information of the storage medium or abnormal recording information generated if abnormal recording is carried out.

The normal recording information includes unique attribute information of the storage medium. It preferably composed of the unique ID information of the storage medium and the unique ID information applied by the disk maker side.

The abnormal recording information includes unique attribute information of the storage medium to be recorded and information (for example, a recording error flag) indicating abnormal recording such as recording errors. Utilizing abnormal recording information allows the unique ID information of the storage medium that has been incorrectly recorded to be specified. Note that the storage medium which should not be come on the market has such the unique ID information.

The administrative information for the storage medium such as number of pieces of the disks delivered from a manufacturing factory is generated from the normal recording information and the abnormal recording information. The administrative information includes payment information in relation to an administration in manufacturing the storage medium such as a cost of manufactured storage medium and its administration fee, and operating life information for recording apparatus for recording the unique attribute information of the storage medium, which will be described more in detail. The administrator side transmits to the orderer side the normal recording information and the abnormal recording information undoubtedlly together with accounting information. The administrator side also transmits the operating life information to the commissioned manufacturer side.

Thus, the administrative information for the storage medium includes the unique attribute information of the storage medium transmitted to the commissioned manufacturer side. Therefore, verification of the unique ID information included in the unique attribute information of the storage medium allows a case where number of pieces of the manufactured storage media is more than that of the ordered storage media to be easily found. Thus, the administrative information for the storage medium permits the number of pieces of the storage media actually manufactured in the factory to be correctly tracked. This results in an accurate administration of manufacture information. Further, the administrator side may report to the orderer side an accurate number of pieces of the manufactured storage media. The administrator side may provide payment information based on the normal recording information for the commissioned manufacturer side. The administrator side may also provide, in some case, maintenance and check information for recording device for recording the unique attribute information of the storage medium that is used in the commissioned manufacturer. This allows the administrator side to easily unify the administration of information for the manufacture of storage medium.

The administrator side reports to the orderer side the unique ID information such as product serial numbers of manufactured and delivered storage media. The orderer side is aware of disk ID (unique ID information such as product serial number of manufactured and delivered storage medium) included in the unique attribute information of the storage medium. The orderer side can compare the disk ID with other disk ID that the orderer side has administered. The orderer side may illustratively check if the storage medium a user (a customer) has purchased is illegal disk on the basis of the unique attribute information of storage medium, which is applied to the purchased storage medium, the unique attribute information being obtained from the customer through a network.

For example, illegal copied disks are determined if the disk having no unique ID information is found or if multiple disks each having the identical unique ID information are found. Thus, the illegal copied disks can be easily specified. Further, if illegal copied disks are put on the market, an investigation where the illegal copied disks are manufactured could be conducted thereon.

When the illegal copied disks is specified, the orderer side may illustratively stop the distribution of demodulation key such as a cipher key and a descrambling key to demodulate contents stored on the storage medium. Further, the orderer side may performs various post-administration procedures such that it can address inquiries about the obtained unique ID information to the administrator side in order to obtain a reply from the corresponding disk maker.

The concluding portion of this specification particularly points out and directly claims the subject matter of the present invention. However, those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 4 is a table showing an example of unique ID information;

FIG. 7 is a table showing an example of unique attribute information of storage medium to be recorded;

FIG. 8 is a table showing an example of relationship between an orderer and unique attribute information of storage medium;

FIG. 9 is a table showing an example of accounting information;

FIG. 10 is a table showing an example of administrative information for maintaining a laser;

FIG. 11 is a block diagram for illustrating a configuration of a system on a site of a commissioned manufacturer side for manufacturing said storage medium;

DESCRIPTION OF THE PREFERRED EMBODIMENT

Preferred embodiments of a method and system for administering storage medium according to the present invention will be described more in detail in view of the accompanying drawings.

A preferred storage medium to which the present invention is applied is disk. Such the disk is as follows: write-once CD-R; Rewritable CD-RW; write-once DVD-R and Rewritable DVD-RW as digital versatile disk (DVD); and Blu-ray Disk. Particularly preferred disk is read-only CD-ROM and DVD-ROM.

According to the invention, during a series of manufacturing processes for disks based on master disk (by a stamper in realty), which will be described later, unique ID information inherent in the disk is recorded on each disk. In this embodiment, information including the unique ID information and the information (applied by a factory side) for specifying a commissioned manufacturer for manufacturing the disks is recorded thereon. Such the information will be referred to as "unique attribute information of disk".

When write-once type CD-R is used as the disk, read-in area at inner radius of the disk may be utilized as recording area for recording the unique attribute information of disk. Data area (program area) may be also utilized as recording area for recording the unique attribute information of disk as the CD-ROM. In this case, the unique attribute information of disk is recorded with it being recorded over the data recorded on the data area. In a method for recording the unique attribute information of disk on CD-ROM, postscribed ID or the like may be used. In a case of DVD as digital versatile disk, burst cutting area available for duplicated recording area may be used as recording area for recording the unique attribute information of disk.

Figure 1:
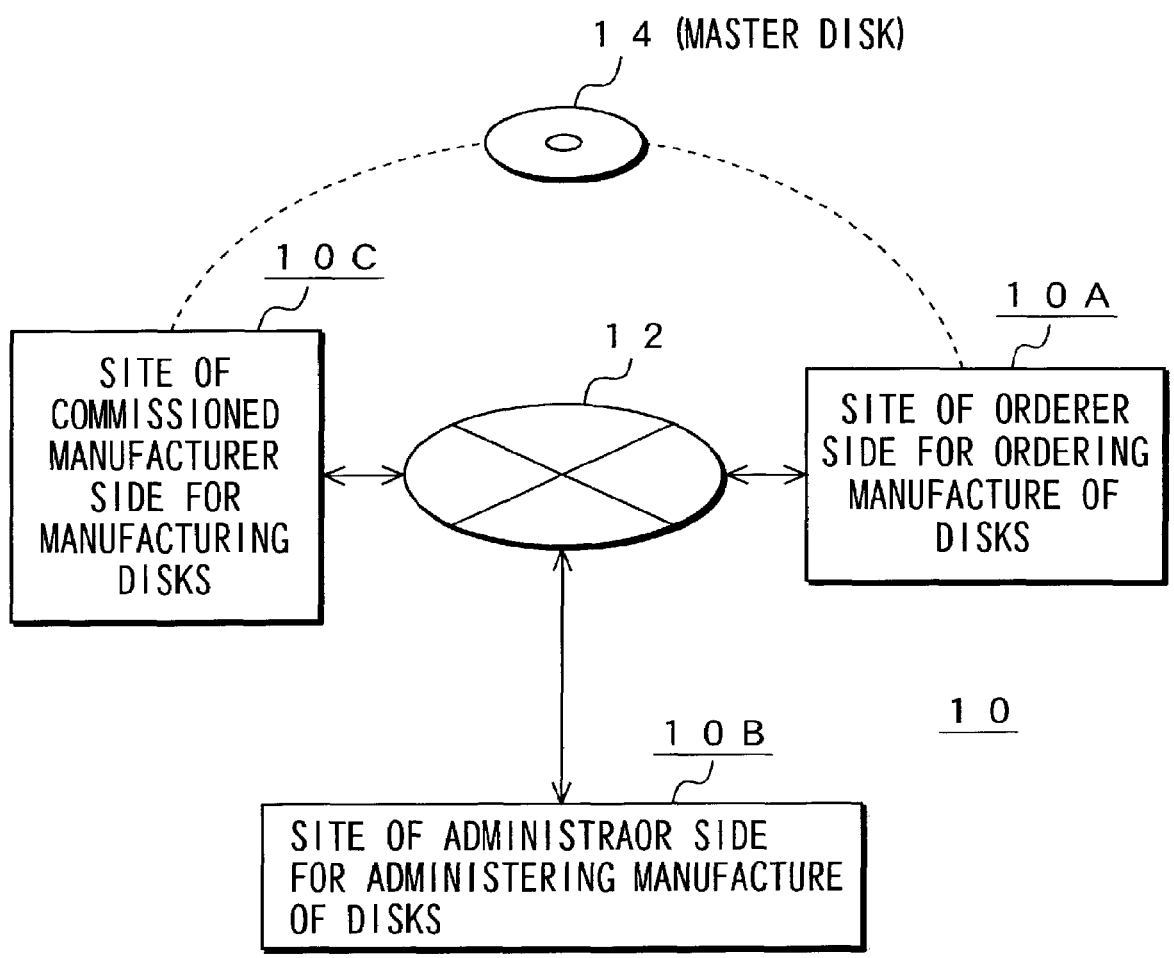
FIG. 1 is a block diagram illustrating a configuration of a network embodying an administrative system for administering manufactured storage medium according to the present invention.

A system for administering storage medium according to the present invention will be described. The disk is used as preferred storage medium. FIG. 1 illustrates an embodiment of the system 10 for administering the disk. The system 10 is composed of a net work 12 in which multiple sites are connected with each other using the Internet or a leased line, a site 10A of an orderer side for ordering manufacture of the disks, a site 10B of an administrator side requested to administer manufacture of the disks, and a site 10C of a commissioned manufacturer side commissioned for manufacturing the disks through the administrator side. The orderer side may directly commission the commissioned manufacturer side to manufacture the disks.

The orderer side is a client for providing software (contents to be stored). The orderer side holds a master disk 14 on which the contents are stored. Alternatively, the orderer side may hold raw data that is not completely stored on the master disk 14 but includes at least information about the contents to be stored thereon. In this embodiment, the commission is conducted through a master disk 14.

The system 10 starts when the orderer side requests the site 10B of the administrator side to administer manufacture of the disks through the net work 12 or by telephone or the like. When a disk maker is specified as commissioned manufacturer, the administrator side requests the specified disk maker to manufacture the disks through the net work 12 or the like. At these moment multiple sites 10A, 10B, and 10C are united through the net work 12 as the sites relative to the system 10, as shown in FIG. 1. If multiple orderers and commissioned manufacturers exist in the system 10, the system 10 may unify the administration of information for the manufacture of disks by administering the orderers and the commissioned manufacturers, respectively.

The site 10B of the administrator side provides various kinds of disk information for the orderer side and generates administrative information for administering the disk based on the unique attribute information of disk stored on the disk when the provided disk information is charged. The site 10B may calculate fees including the costs for manufacturing the disks and administering the manufacture of disks and provide such the fees as accounting information for the orderer side to demand the fees, respectively or in a lump, as the administration fees. The site 10B may generate operating life information for a source of light (a laser for writing) in an ID writing device for writing the unique attribute information of disk and provide charged information for maintaining and checking the ID recording device for the orderer side.

Since the master disk includes the contents, the site 10A of orderer side may transfer the contents directly to the site 10C of a commissioned manufacturer side, the disk maker side, as shown in FIG. 1. When the contents are transferred to the site 10C via the site 10B, the master disk 14 storing the unique attribute information of disk or other media storing the unique attribute information of disk may be transferred to the site 10C, the disk maker.

Figure 2:
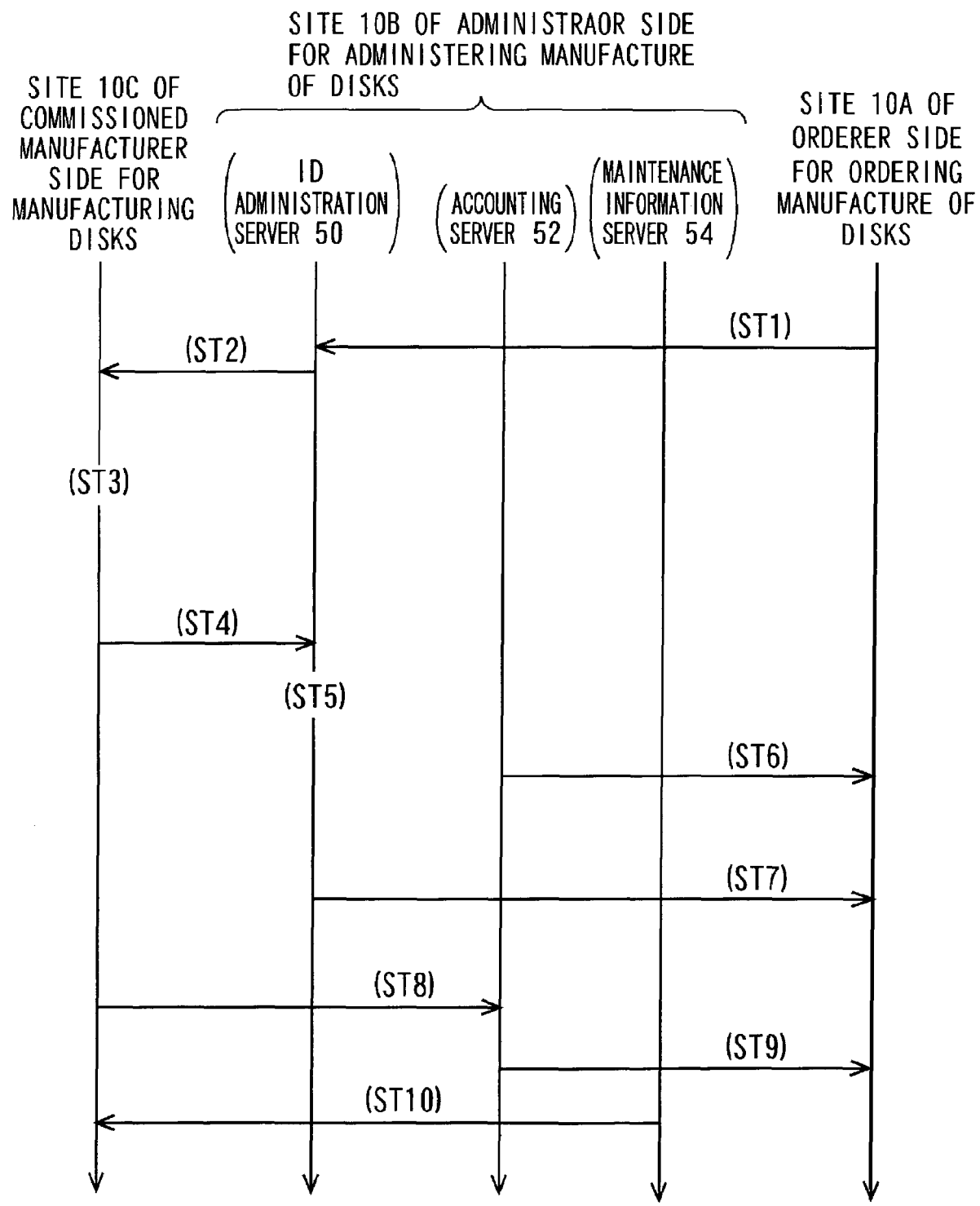
FIG. 2 is a flow chart for illustrating processes as administering manufactured storage medium.

FIG. 2 is a flow chart for illustrating processes carried out in the system 10. As described above, three sites 10A, 10B, and 10C are worked together through the network 12. The site 10B performs three processes, a provision of the normal recording information and the abnormal recording information, a demand for administration fees (an account), and a provision of the maintenance and check information. Therefore, a total of five processing modes operate with them being cooperated with each other as shown in FIG. 2.

Referring to FIG. 2, the site 10A of the orderer side first provides the unique ID information for the site 10B of the administrator side. In the site 10B, an ID administration server stores the unique ID information thus provided (Step 1).

When the provided unique ID information is composed of disk ID excluding product serial number of the disk, the site 10B verifies whether this disk ID has been already used or is used by the specified commissioned manufacturer side. When this disk ID has been used or is used by the specified commissioned manufacturer side, the site 10B refers it to the orderer side and/or informs the orderer side that this provided unique ID information includes prohibitive disk ID. This allows inherent unique ID information to be recorded on each of the disks.

Alternatively, when it is certain that the unique ID information matches previously registered data, this can be determined if authorized client who has the contents requests the manufacture of disks, thereby avoiding an order for the manufacture of disks by unauthorized client.

After such the verification is completed, the site 10B of the administrator side requests the site 10C of the commissioned manufacturer side to manufacture the disks (Step 2). Simultaneously, the unique ID information after the verification and a master disk 14 including the contents are transferred to the site 10C directly or through the site 10B.

The duly commissioned manufacturer side in the site 10C forms a stamper for manufacturing the disks from the master disk 14 and manufactures the disks using the stamper (Step 3). In the final process of these manufacturing processes, the unique ID information is recorded on a predetermined area in the disk.

Information including this unique ID information of disk and identification information inherent in commissioned manufacturer side (a name of factory, number of an apparatus for writing IDs, date and time of the record, and the like) is used as the unique attribute information of disk. This unique attribute information of disk is really recorded on each disk as identification information inherent in each disk.

The recording process is incorporated into a series of manufacturing processes for the disks as one step therefor so that the recording process is always carried out. The commissioned manufacturer side prints a label of the disk or the like and performs an assembling process to obtain a finished product. The finished products are delivered or distributed. Although this recording process for the unique attribute information of disk has been described as being done during the manufacturing processes for the disks, distributors, sales offices or the like, which are connected with each other through the network, may also record the unique attribute information on the disks.

Figure 13:
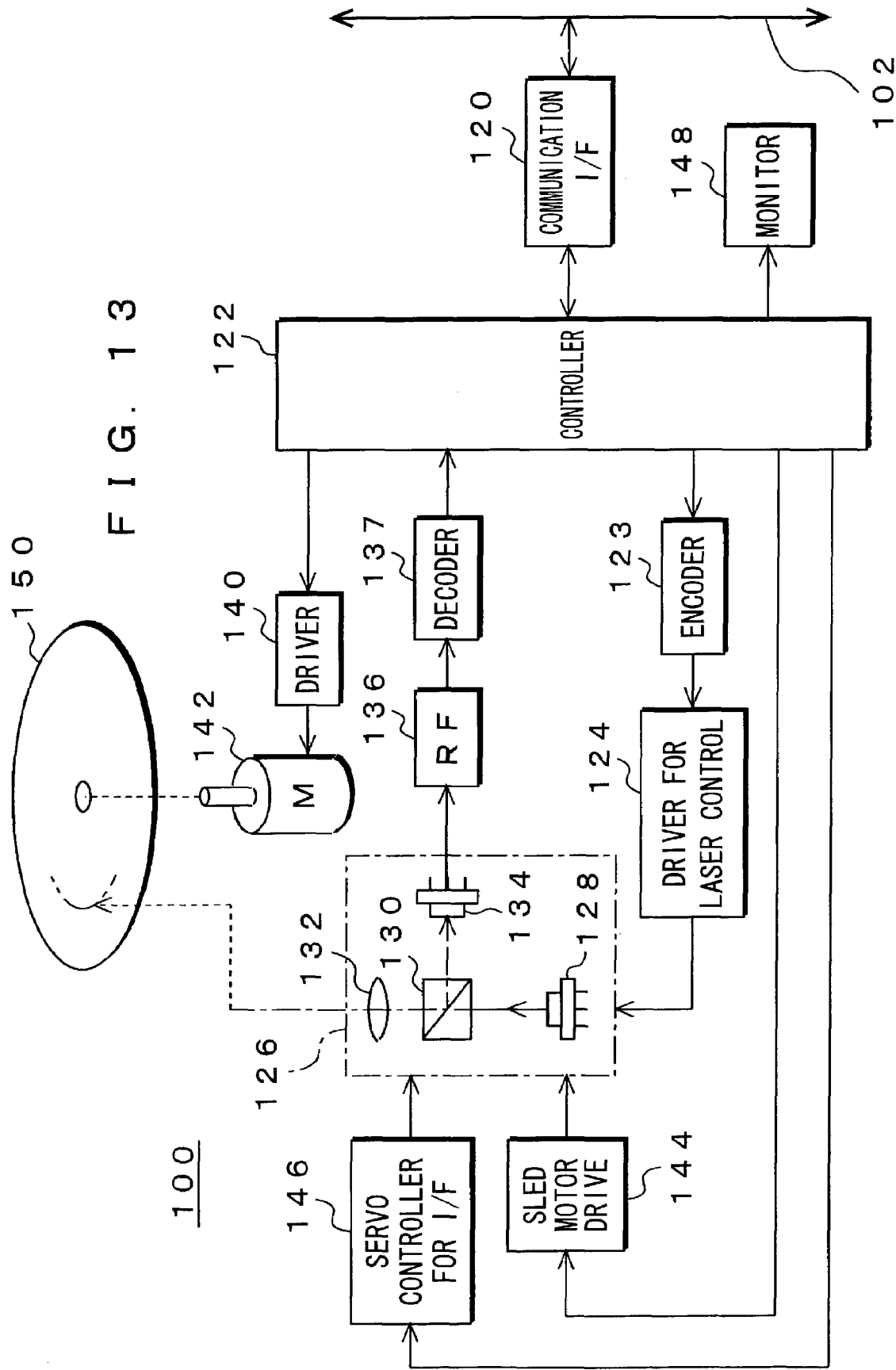
FIG. 13 is a block diagram showing an example of an apparatus for writing IDs.

The apparatus 100 for writing IDs has a recording device for recording the unique attribute information of disk using a laser as a source of light (see FIG. 13). Using a high-power laser, the recording device records on the disk the unique attribute information of disk including the unique ID information, the unique attribute information being received from storage server 80, positioned at the site 10C, for storing the unique attribute information of disk (see FIG. 11), which will be described later. The apparatus 100 has various functions such that written information can be read out and then, the read information be compared with stored unique attribute information, in order to make sure that the unique attribute information of disk has been normally written.

When the unique attribute information of disk has been normally written on the disk, the storage server 80 stores as normal recording information the unique attribute information of disk as it is. Alternatively, when the unique attribute information of disk has been abnormally written on the disk (including some cases that the information cannot be correctly read, and it is found out that the written information is different from the information to be written), the storage server 80 stores as abnormal recording information the unique attribute information of disk that has been written, together with identification information (for example, recording error flag) indicating the abnormal recording (Step 3).

The site 10C also transfers the normal recording information and the abnormal recording information to the site 10B of the administrator side where an administration server 50 for administering manufacture of the disks (see FIG. 5) stores them (Step 4). Transferring the normal recording information and the abnormal recording information to the site 10B of the administrator side can be carried out each writing time step by step or by one operation.

The site 10B utilizes as disk administrative information the normal recording information and the abnormal recording information thus received. The site 10B first inquires whether the unique ID information and the identification information inherent in the commissioned manufacturer side (a name of maker or its factory, date, month, and year of manufacturing the disk, and the like) are correctly recorded (Step 5). It also is possible to supply a result of the inquiry to the site 10C of the commissioned manufacturer side to give it feedback on the quality control.

Figure 5:
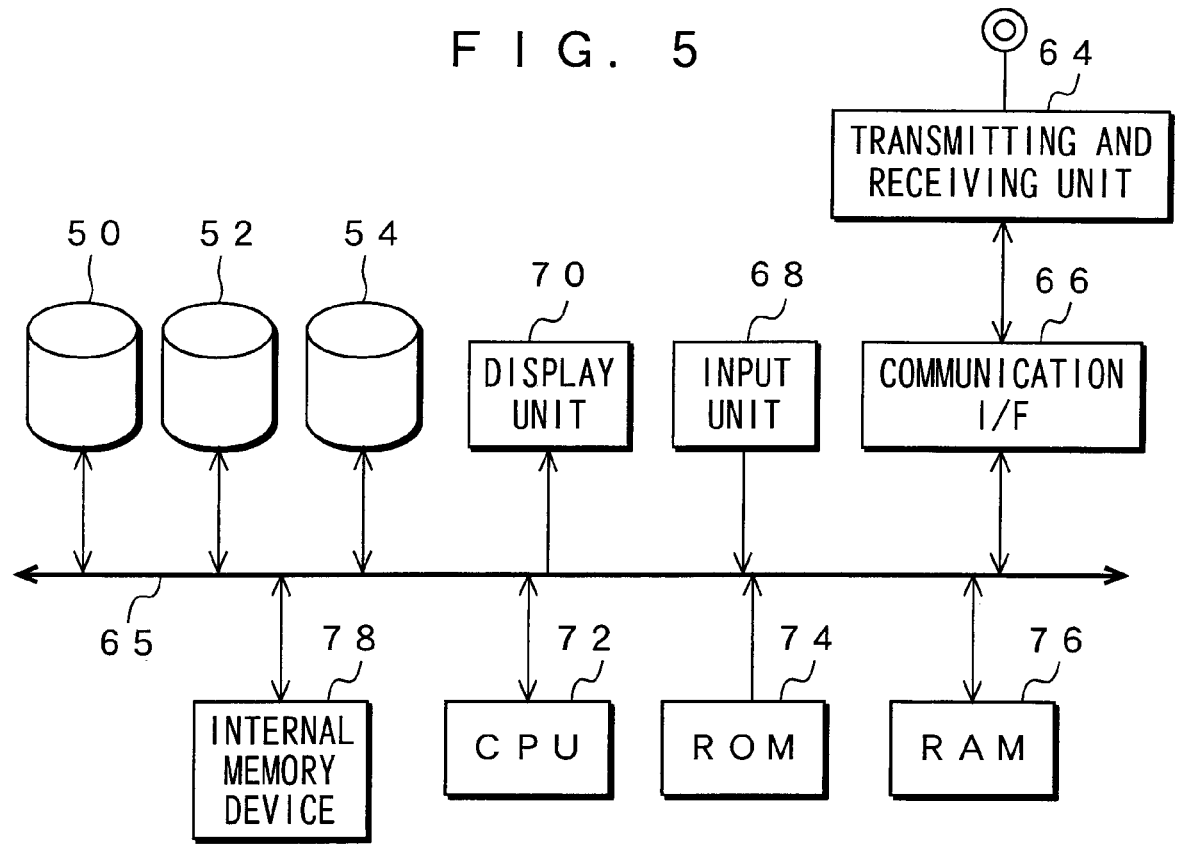
FIG. 5 is a block diagram for illustrating a configuration of a system on a site of an administrator side for administering manufacture of the storage medium.

Accounting server 52 shown in FIG. 5 stores the normal recording information for the deliverable disks that are determined as excellent products at the result of the inquiry. The site 10B adds up various fees such as a fee for administering the disks based on the normal recording information and then, it demands a charge therefor to the site 10A (Step 6). Simultaneously, the site 10B transfers the normal recording information and the abnormal recording information to the site 10A (Step 7). The normal recording information and the abnormal recording information may be used for post-administration of the disk for inquiring about information (unique ID information) obtained from a user (a disk purchaser).

The disks recording the unique attribute information abnormally are regarded as the faulty disks. Subtracting number of pieces of the faulty disks from that of the actually manufactured disks equals real number of pieces of the disks that are actually manufactured and records the unique attribute information thereon. Based on such the real number of pieces of the disks, the site 10C of the commissioned manufacturer side transfers accounting information including commission for manufacturing the disks to the site 10B of the administrator side where the accounting server 52 stores the accounting information (Step 8). In the site 10B remains the information about number of pieces of the exactly delivered disks. The site 10B may verify whether a demanded charge (a charge for manufacturing the disks) is correct by comparing the charged amount with an amount of money calculated according to the real number of pieces of the delivered disks. If correct, this charge for manufacturing the disks may be then demanded on the site 10A (Step 9). The site 10C may directly demand a charge for manufacturing the disks on the site 10A with deleting the Step 9. At any rate, the information about number of pieces of the exactly delivered disks also remains in the site 10A (Step 7). Therefore, the site 10A can verify whether a demanded charge is correct by comparing the charged amount with an amount of money calculated according to the real number of pieces of the delivered disks.

Maintenance information server 54 also stores the normal recording information and the abnormal recording information on which operating life for a laser implemented in an apparatus for writing the unique attribute information of disk is calculated. The maintenance information server 54 stores the operating life information as maintenance and administrative information (see FIG. 5). If necessary, this maintenance and administrative information could be transferred to the site 10C (Step 10).

Thus, administering the disks that record the unique attribute information of disk as described above allows the site 10A to receive at least the same number of pieces of the unique attribute information of disk as the number of pieces of the real numbers of the disks delivered to the site 10A. Further, the site 10C of the commissioned manufacturer side may record on each of the manufactured disks the unique ID information that the site 10A of the orderer side provides during one of the disk manufacturing processes. This previously prevents an accident that the disk having no unique ID information is manufactured from occurring.

When it is found that unique ID information written on the disks on the market is different from the unique ID information of disks stored on the site 10A, the site 10A and/or the site 10B easily verify whether this disk is illegally copied by merely checking both of the unique attribute information of disks, particularly the disk ID of the unique ID information.

Checking the unique attribute information of disk allows for investigate which disk maker manufactures the illegal copied disk.

The disks recording the unique attribute information abnormally are abandoned as the faulty disks. If such disks are put on the market, any of the site 10A and/or the site 10B may verify illegal acquisition of the disks because they have a list including the unique attribute information of the faulty disks.

Figure 3:
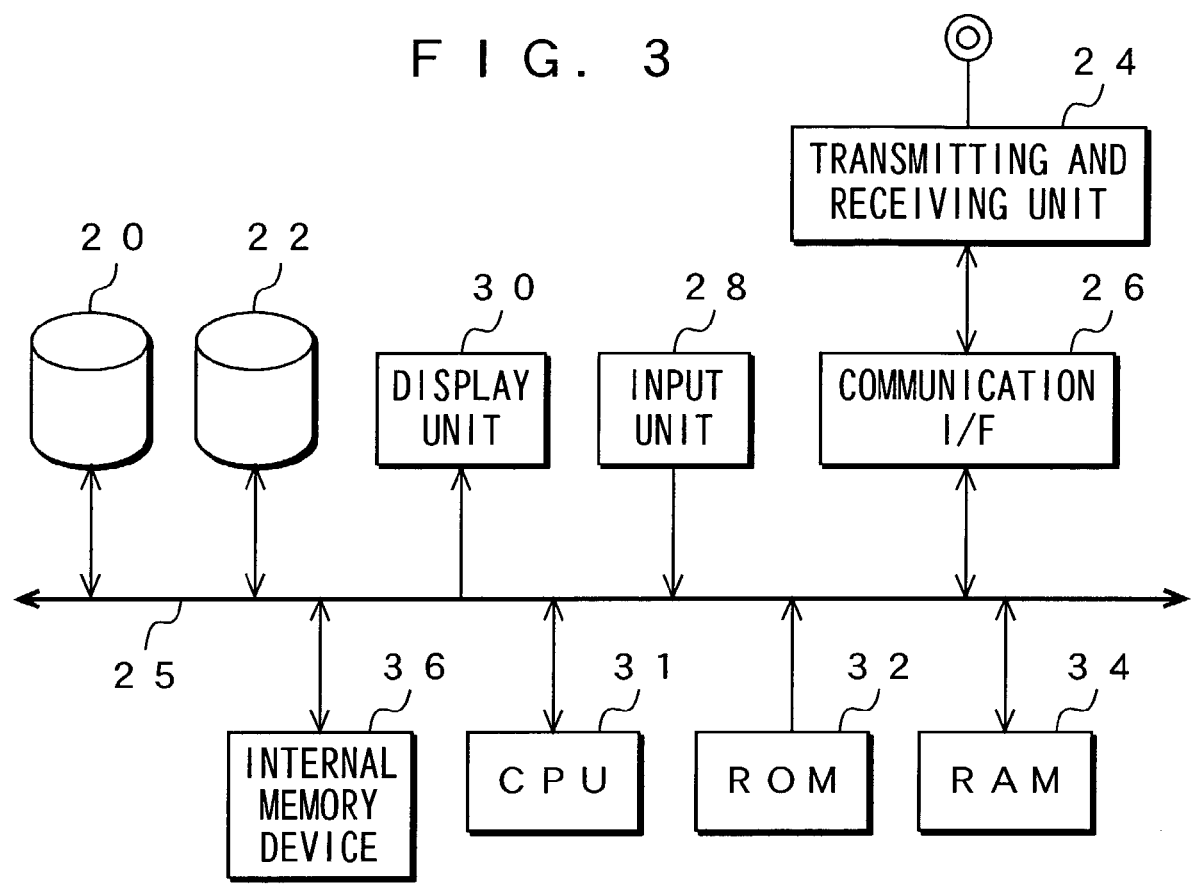
FIG. 3 is a block diagram for illustrating a configuration of a system on a site of an orderer side for ordering manufacture of the storage medium.

FIG. 3 illustrates a configuration of a system on the site 10A of the orderer side for ordering manufacture of the disks.

Referring to FIG. 3, the site 10A includes storage server 20 for storing unique ID information of the unique attribute information of the disk, and holding server 22 for holding the unique ID information.

The unique ID information includes the 7 or 8-digit unique identification number obtained from a random number generator or the like, and disk ID involving product serial number sequentially increased. The servers 20 and 22 may comprise a large-sized storage medium such as a hard disk apparatus and semiconductor memory device.

The site 10A of the orderer side further comprises transmitting and receiving unit 24 for communicating with the Internet 12. The transmitting and receiving unit 24 is also connected with internal bus 25 though an interface 26 for communication. In order to allow the site 10A to obtain various functions for a general information terminal, the site 10A comprises input unit 28 including a mouse and a keyboard, a display unit 30 such as a liquid crystal display (LCD), CPU 31 as control unit for controlling the entire site, memory device 32 such as ROM for storing various species of computer programs for communicating with the Internet 12 and for transmitting and receiving the information to and from other site(s), another memory device 34 such as flush-memory and RAM for expanding the program or the like, and internal memory device 36 for internal processing.

In a case where multiple commissioned manufacturers are ordered to manufacture the disks, adoption of such a configuration allows the site 10A to keep track with reliability such that what size of the unique ID information they should use can be provided for any commissioned manufacturers by means of administration with adding the information for commissioned manufacturers (for example, names of the disk makers) into the unique ID information.

FIG. 4 is a table showing an example of the unique ID information. In this embodiment, the unique ID information comprises names of the orderers (soft customers) for ordering manufacture of the disks, identification numbers of the orderers (customer numbers), names of the titles of disks (names of albums), and disk IDs including particular digit product serial numbers. A configuration of the unique ID information as shown in FIG. 4 is illustratively listed so that it is not limited to this configuration.

FIG. 5 illustrates a configuration of a system for administering disk provided for the site 10B of the administrator side. Referring to FIG. 5, the system in the site 10B of the administrator side comprises transmitting and receiving unit 64 for communicating with the Internet 12. The transmitting and receiving unit 64 is also connected with internal bus 65 though a communication interface 66. The system further comprises administration server 50 for storing the received unique ID information, input unit 68 including a mouse and a keyboard, a display unit 70 such as a liquid crystal display (LCD), CPU 72 as control unit for controlling the entire site, memory device 74 such as ROM for storing various species of computer programs for communicating with the Internet 12 and for transmitting and receiving the information to and from other site(s), another memory device 76 such as flush-memory and RAM for expanding the program or the like, and internal memory device 78 for internal processing.

The transmitting and receiving unit 64 may receive the unique ID information provided by the orderer side for ordering manufacture of the disks, said unique ID information being applied to the disk. The unit 64 may transmit the stored unique ID information to the commissioned manufacturer side for manufacturing the disk. When recording on the disk the unique attribute information of disk including identification information for the commissioned manufacturer side, normal recording information is generated if normal recording is carried out or abnormal recording information is generated if abnormal recording is carried out. The unit 64 may also receive the normal recording information and the abnormal recording information.

The administration server 50 may store the normal recording information and the abnormal recording information thus received. The administration server 50 may also store not only the unique ID information provided by the orderer side, but also the information inherent in the commissioned manufacturer side to be used when manufacturing the disks, which is provided by the commissioned manufacturer side.

The CPU 72, and memory devices 74 and 76 are functioned as administrative-information generating means for generating administrative information about the disks from the normal recording information and the abnormal recording information.

The system in the site 10B further comprises accounting server 52 for performing accounting processes such as a demand of administration fees, and maintenance information server 54 for storing maintenance and check information. Thus, these servers 52 and 54 may store the above administrative information. The above servers 50, 52, and 54 may be designed as one-piece, not separate ones.

The CPU 72 controls the entire site 10B to establish effective communication between the sites 10A and 10C, thereby allowing the disks to be effectively administered.

Figure 6:
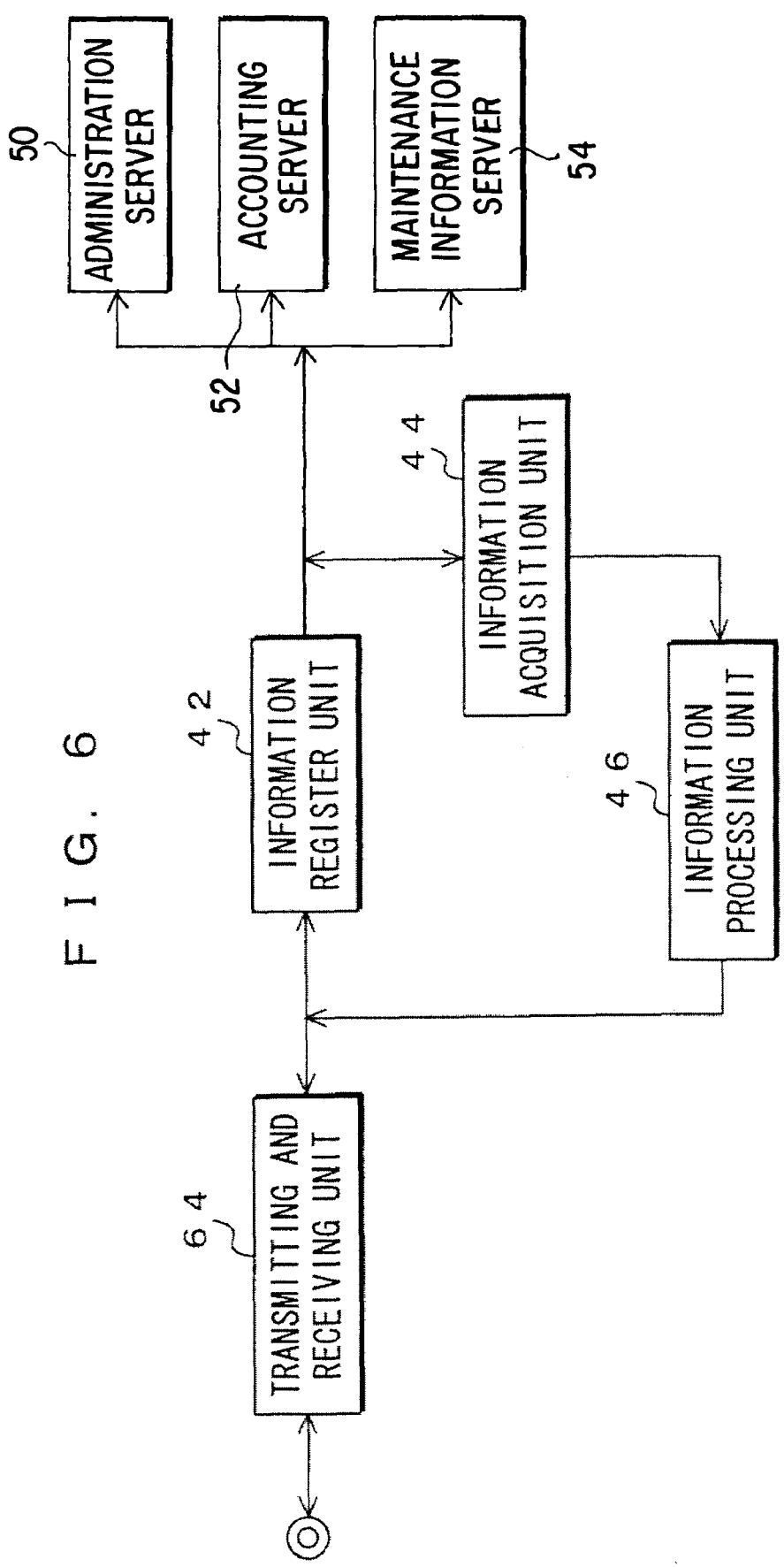
FIG. 6 is a block diagram illustrating operating processes in a site of an administrator side for administering manufacture of the storage medium.

FIG. 6 functionally illustrates operating processes in the site 10B of the administrator side. Referring to FIG. 6, the transmitting and receiving unit 64 receives the unique ID information from the site 10A of the orderer side, for example. The unit 64 then transfers the unique ID information thus received to information register unit 42 that verifies which the unique ID information is identical to the one that has been already registered. If not identical, this unique ID information is newly registered in the administration server 50 and/or other servers 52 and 54. If identical, this unique ID information is inquired in the site 10A, as described above.

When the site 10B receives a command to read out the unique ID information, information acquisition unit 44 stores the unique ID information temporarily. Information processing unit 46 then performs information processing according to the command and transfers the information on a result of the information processing to the unit 64 that transmits the information on a result of the information processing to the site 10A of the orderer side and/or the site 10C of the commissioned manufacturer side.

FIG. 7 shows an example of the unique attribute information of disk. The unique attribute information of disk comprises the unique ID information provided by the administrator side (or the orderer side) and the identification information inherent in the disk maker (factory) side to be applied to the disk by the disk maker side. FIG. 7 illustrates the identification information inherent in one factory, which is applied to the disk by the factory.

In FIG. 7, data of date and time indicates date and time when the unique attribute information of disk is written on the disk. Data of numbers of apparatus for writing the unique attribute information of disk indicates an apparatus for writing IDs used when the unique attribute information of disk is written on the disk. Referring to FIG. 7, the identification information inherent in the commissioned manufacturer side includes numbers of apparatus for writing IDs, name of factory in the disk maker (disk maker code). This identification information is used to specify the commissioned manufacturer side. The identification information, however, may include only numbers of apparatuses for writing IDs if the site 10B of administrator side exactly administers the numbers of apparatuses for writing IDs and the names of factories in the disk makers. Various pieces of the information provided by the administrator side are the same as those described referring to FIG. 4. Therefore, the description thereof is omitted.

The normal recording information generated when recording the unique attribute information on disk is transmitted from the site 10C of the commissioned manufacturer side to the site 10B of administrator side according to a form as shown in FIG. 8. This normal recording information comprises the unique attribute information of disk and names of the commissioned manufacturers. The administration server 50 for manufacturing the disks stores this normal recording information. If multiple commissioned manufacturers are to be administered, the names of the commissioned manufacturers (disk makers) are required. FIG. 8 illustrates an example where two commissioned manufacturers (ABC and DEF companies) are to be administered.

Referring to FIG. 8, as the recording information of commissioned manufacturers side transmitted is only numbers of apparatuses for writing IDs actually used when the unique attribute information of disk is recorded on the disk, selected out of the pieces of information such as names of commissioned companies (disk makers), names of factories in the disk makers (disk maker codes), and numbers of the apparatuses for writing IDs implemented on the factories of the disk makers. Various pieces of the information listed in the column, "THE UNIQUE ATTRIBUTE INFORMATION OF DISK RECORDED ON THE DISK", shown in FIG. 8 are actually written on the disk. The column, "THE UNIQUE ATTRIBUTE INFORMATION OF DISK RECORDED ON THE DISK", includes disk maker codes, year, month and date of manufacture, its time, numbers of apparatuses for writing IDs, customers, titles, and disk IDs.

Obtaining such the information allows for easily and clearly acknowledge when the disks are stamped (manufactured), who stamps the disks, which factory stamps the disks.

FIG. 9 shows an example of payment (accounting) information based on the normal recording information. This payment information is calculated as administration expenses including various fees such as disk manufacturing fee and administration fee based on the normal recording information that is information on the delivered disks. This payment information is collected. The accounting server 52 stores the payment information thus collected. The site 10B of administrator side demands a charge based on the payment information on the site 10A of the orderer side.

FIG. 9 also shows the information relative to the payment information. In this embodiment, name of the orderer (client) for ordering manufacture of the disks, names of disk makers (commissioned companies), names of its factories, information on the delivered disks are shown. Such the information is required for administering the commissioned manufacturer side.

FIG. 10 shows an example of administrative information for maintaining and checking an apparatus for writing IDs, particularly operating life information of a laser (a source of light) as writing means. FIG. 10 respectively shows as contents of the operating life information cumulative times of using an apparatus for writing IDs (times of used IDs) and life expectancy degree (%) up to mean operating life of a laser. Operating life of a laser implemented in the apparatus for writing IDs generally shows a proportional decrease against conducted times of writing IDs. Thus, the life expectancy degree (%) is calculated as the operating life information of the laser by subtracting the conducted times of writing IDs from previously set times of correctly writing IDs (life times).

This life expectancy degree, however, considerably varies according to patterns of actually writing IDs. Therefore, it is necessary that database therefor is first made and then in actual operation over a period of time so that the database can accumulate track records every time the laser cannot write IDs. This allows occurring time of faulty to be exactly assumed.

Alternatively, if it is obvious that faulty times in writing IDs increase with laser power lessening, database may accumulate the faulty times, thereby allowing exact prediction for next necessary maintenance time thereof to be established.

According to a configuration of an apparatus for writing IDs, current through a laser (laser diode) is given feed-back by means of automatic power control (APC) system so that a laser with constant laser power can be automatically output. The apparatus 100 for writing IDs (FIG. 11) has function of monitoring variation of this current values, which will be described later, and information storage server 82 (FIG. 11) for writing the unique attribute information of disk then stores the current values. When operating life information of a laser is made referring to the information on these current values transmitted together with the unique attribute information of disk, it is possible to obtain more exact maintenance and check data. This information on these current values is stored on the maintenance information server 54 in the site 10B of the administrator side.

The unique attribute information of disk that is shown in FIG. 10 is also stored on the maintenance information server 54, as shown in FIG. 5, in the site 10B of the administrator side as administrative maintenance information. The site 10B provides the stored administrative maintenance information for the site 10C of the commissioned manufacturer at a suitable timing (if necessary, being charged).

This administrative maintenance information may also be created in the site 10C of the commissioned manufacturer. In this embodiment, however, the site 10B of the administrator side creates this information to handle it as being charged.

FIG. 11 illustrates a configuration of a system on the site 10C of a commissioned manufacturer side for manufacturing the disks. In this system on the site 10C, multiple servers are also provided, like the description in relation to FIG. 5 or the like.

In this embodiment in which multiple apparatuses 100 for writing IDs are provided, these apparatuses 100 are respectively connected with a communication interface 101 through a network 102 in a factory.

Information storage server 80 for storing the unique attribute information transmitted from the site 10B of the administrator side is implemented in the site 10C. The unique attribute information including the unique ID information is written on each disk with them being sequentially updated, by mutually associating the information storage server 80 with these apparatuses 100 for writing IDs (see FIG. 8).

The site 10C requests the site 10A to supply the unique ID information through the site 10B against insufficient supply of unique ID information.

The writing information storage server 82 stores the unique attribute information of disk that has been written on the disk. When unique attribute information of the disk is normally written on the disk, the writing information storage server 82 stores this unique attribute information as the normal recording information. When unique attribute information of the disk is abnormally written on the disk, the writing information storage server 82 stores it as the abnormal recording information.

Herein, the abnormal recording information means the information including the unique ID information of the disk on which the site 10C tries to write the unique ID information but fails to write it, and identification information inherent in the maker, adding a recording error flag.

This system has the same configuration as that of the system shown in FIG. 3 to perform the information terminal processing. Therefore, like reference numbers (84-98) are applied to the parts corresponding to those shown in FIG. 3 and the description thereof is omitted.

Figure 12:
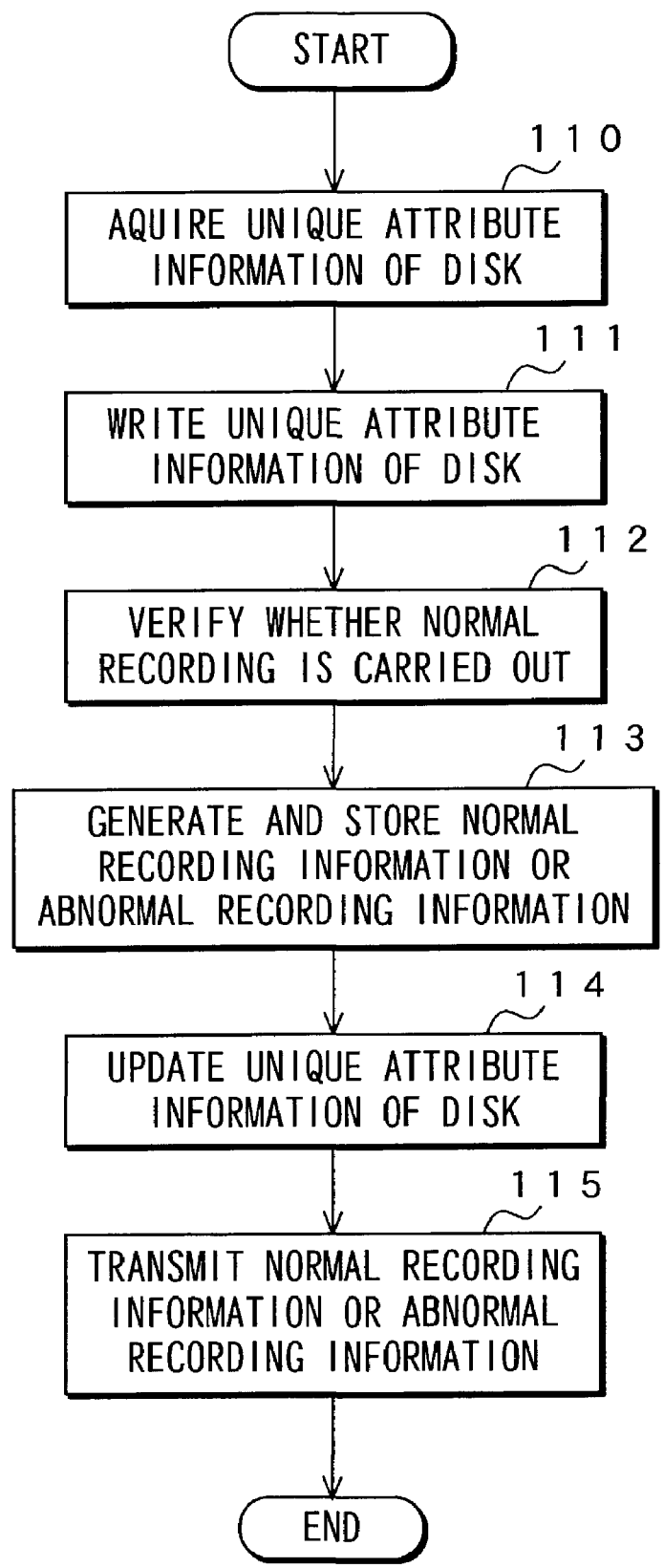
FIG. 12 is a block diagram for illustrating writing processes of unique attribute information of storage medium.

FIG. 12 illustrates writing process of the unique attribute information of disk.

The site 10C acquires the unique attribute information of disk from the information storage server 80 for storing the unique attribute information at a step that the disk is transferred into writing process (Step 110). The disk is subjected to the writing processing using the unique attribute information thus acquired (Step 111). When the writing processing is completed, the disk is subjected to read-out processing to read the information written on the disk out of the disk. This information is verified whether it is normally written (Step 112). As a result thereof, the writing information storage server 82 then stores the unique attribute information as the normal recording information or the abnormal recording information (Step 113).

The unique attribute information of disk is subjected to the update processing (Step 114). The site 10C of the commissioned manufacturer side transmits to the site 10B of the administrator side the stored normal and abnormal recording information at a suitable timing in a predetermined lot unit (Step 115).

The above processes are repeated until the unique ID information becomes lost. If lost, the writing process of the unique attribute information of disk is finished.

FIG. 13 shows a configuration of an apparatus 100 for writing IDs. The above apparatus for writing IDs may have such a configuration. This apparatus 100 essentially has the same configuration as that of the well-known recording and reproducing apparatus of disk.

Referring to FIG. 13, the unique attribute information of disk transmitted from the site 10B of the administrator side is captured to the information storage server 80 for storing the unique attribute information through communication interface 120 and controller 122 including CPU. The unique attribute information of disk thus captured is read out at a suitable timing. Encoder 123 receives the unique attribute information of disk thus read and convert it to data having a format suitable for recording. Drive 124 for laser control is driven based on the formatted unique attribute information of disk.

If there are multiple apparatuses 100, they are connected with the network 102 in the factory through the communication interface 101. In this configuration, CPU 92 may be also shared so that the unique attribute information of disk can be transmitted and received to and from respective apparatuses 100. Of course, the storage server 80 and the information storage server 82 may be also shared.

The drive 124 controls a laser 128 implemented in an optical pickup unit 126. As well-known matters, the drive 124 controls laser power to become high-power such as about 50 mW when the information is written on the disk 150 and to become several-mW power (about 3 mW) when the information is read out the disk 150.

It is a well-known fact that the optical pickup unit 126 has multiple optics in addition to the laser 128. The laser 126 radiates laser beam to the disk 150 via these optics, thereby allowing the unique attribute information of disk to be recorded. Although the entire optics are not shown in FIG. 13, typical optics including beam splitter 130 and an object lens 132 are shown therein. Reflected light by the disk 150 is reached to a light detecting element 134 via the object lens 132 and the beam splitter 130, thereby allowing the read information to be converted into electric signal (reproduction signal).

Decoder 137 receives the reproduction signal through RF amplifier 136 and demodulates it. The controller 122 receives the reproduction signal thus demodulated. In order to write and read the information on and out the disk 150, the controller 122 controls the drive 140 to drive motor 142 to rotate the disk 150 so that a constant linear velocity (CLV) thereof may be made. Further, the controller 122 controls a sled motor 144 to slide the optical pickup unit 126 in a radial direction of the disk 150. The controller 122 controls servo controller 146 to adjust the optical pickup unit 126 under biaxial control to correctly write the information and read out the written information, based on tracking signal and focus signal obtained from the reproduction signal, which is well known.

In order to write the unique attribute information of disk on desired area in the disk 150, the data therefor is read out the disk 150 and address information of the disk 150 is extracted from the data thus read. Position in the disk 150 on which the unique attribute information of disk should be written is searched. When the optical pickup unit 126 reaches the position, the unique attribute information of disk is written on this position.

Immediately following this writing processing, the unique attribute information of disk actually written is subject to the read-out processing so that it can verify which the recording is normal or abnormal. This result is stored in the information storage server 80 as the normal recording information or the abnormal recording information.

Thus has been described a method and system for administering storage medium according to the present invention wherein the unique attribute information of disk is obtained from the orderer side for ordering manufacture of storage medium, and administrative information for manufacturing the storage medium is generated from the normal recording information and the abnormal recording information provided by the commissioned manufacturer side. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A method of administering a storage medium, said method comprising:
    obtaining unique ID information related to manufacture of said storage medium provided by an orderer side which requests manufacturing of the storage medium, said unique ID information being electronically stored on said storage medium;
    providing a commissioned manufacturer, which will manufacture said storage medium, with said unique ID information obtained;
    obtaining normal recording information and/or abnormal recording information when recording on said storage medium unique attribute information of the storage medium including manufacturer identification information identifying said commissioned manufacturer, said normal recording information being generated if the recording is normally carried out, and said abnormal recording information being generated if the recording is abnormally carried out; and
    generating administrative information for said storage medium from at least one of said normal recording information and/or said abnormal recording information.

2. The method of administering a storage medium according to claim 1, wherein said normal recording information includes unique attribute information of the storage medium; and
    said abnormal recording information includes unique attribute information of the storage medium and information indicating abnormal recording.

3. The method of administering a storage medium according to claim 1, wherein said administrative information includes at least one of payment information in relation to an administration in manufacturing said storage medium, and operating life information for recording means for recording said unique attribute information.

4. The method of administering a storage medium according to claim 1, further comprising:
    generating from said normal recording information said payment information in relation to an administration in manufacturing said storage medium.

5. The method of administering a storage medium according to claim 1, further comprising:
    generating from said normal recording information and said abnormal recording information, operating life information for a means for recording said unique ID information.

6. The method of administering a storage medium according to claim 1, further comprising:
    comparing said unique ID information provided by said orderer side for ordering manufacture of the storage medium with unique ID information that has already been commissioned and registered; and
    providing said commissioned manufacturer side with said unique ID information provided by said orderer side when said unique ID information provided by said orderer side is not identical to the registered unique ID information.

7. The method of administering a storage medium according to claim 6, further comprising:
    comparing said unique ID information provided by said orderer side for ordering manufacture of the storage medium with registered unique ID information that has already been commissioned and registered; and
    inquiring to said orderer side said unique ID information provided by said orderer side when said unique ID information provided by said orderer side is identical to the registered unique ID information.

8. The method of administering a storage medium according to claim 1, wherein said storage medium is a disk-like storage medium.

9. A system for administering a storage medium, comprising:
    unique ID information transmitting and receiving means for receiving the unique ID information related to manufacture of said storage medium provided by an orderer side, which requests manufacturing of the storage medium, said unique ID information being electronically stored on said storage medium, and transmitting said unique ID information to a commissioned manufacturer for manufacturing said storage medium, said transmitting and receiving means also receiving normal recording information and/or abnormal recording information when recording on said storage medium unique attribute information of the storage medium including manufacturer identification information identifying said commissioned manufacturer, said normal recording information being generated if the recording is normally carried out, and said abnormal recording information being generated if the recording is abnormally carried out;
    administrative-information generating means for generating administrative information about said storage medium from at least one of said normal recording information and/or said abnormal recording information;
    storage means for storing said unique ID information, said normal recording information and said abnormal recording information each thus received, and said administrative information; and
    control means for controlling said transmitting and receiving means, said administrative-information generating means, and said storage means to administer said storage medium.

10. The system for administering a storage medium according to claim 9, wherein said unique ID information transmitting and receiving means includes:

receiving means for receiving said unique ID information provided by said orderer side, and receiving any one of said normal recording information and said abnormal recording information when recording on said storage medium the unique attribute information of the storage medium; and transmitting means for transmitting said unique ID information stored on said storage means to said commissioned manufacturer.

11. The system for administering a storage medium according to claim 9, wherein said storage means includes:

first storage means for storing said unique ID information received;

second storage means for storing said normal recording information and abnormal recording information received; and third storage means for storing said administrative information.

12. The system for administering a storage medium according to claim 9, wherein said normal recording information includes unique attribute information of the storage medium; and said abnormal recording information includes unique attribute information of the storage medium and information indicating abnormal recording.

13. The system for administering a storage medium according to claim 9, wherein said administrative information includes at least one of payment information in relation to an administration in manufacturing said storage medium, and operating life information for recording means for recording said unique attribute information.

14. The system for administering a storage medium according to claim 9, wherein said control means controls said administrative-information generating means to generate from said received normal recording information payment information in relation to an administration in manufacturing said storage medium.

15. The system for administering a storage medium according to claim 9, wherein said control means controls said administrative-information generating means to generate from said normal recording information and said abnormal recording information operating life information for a means for recording said unique ID information.

16. The system for administering a storage medium according to claim 9, wherein said control means allows for comparing said unique ID information provided by said orderer side with unique ID information that has already been registered and stored on said storage means.

17. The system for administering a storage medium according to claim 16, wherein based on a result of said comparing process by said control means, said unique ID information provided by said orderer side is transmitted to the commissioned manufacturer when said unique ID information provided by said orderer side is not identical to the unique ID information that has already been registered and stored on said storage means, and said unique ID information provided by the orderer side is inquired to said orderer side when said unique ID information provided by said orderer side is identical to the registered and stored unique ID information.

18. The method of administering a storage medium according to claim 1, wherein said manufacturer identification information includes the name of said manufacturer.

19. The method of administering a storage medium according to claim 1, wherein said manufacturer identification information includes the date of manufacture of said storage medium.

20. The method of administering a storage medium according to claim 1, wherein said manufacturer identification information includes a name of a recording apparatus used in said recording on said storage medium said unique attribute information.

21. The method of administering a storage medium according to claim 1, wherein the storage medium is an optical storage medium.

\* \* \* \* \*